May 31, 1966  J. MAURICE  3,253,684
DRIVE TRANSMISSIONS
Filed July 24, 1964  6 Sheets-Sheet 1

INVENTOR
JEAN MAURICE
By Irwin S. Thompson
ATTY.

May 31, 1966  J. MAURICE  3,253,684
DRIVE TRANSMISSIONS

Filed July 24, 1964  6 Sheets-Sheet 3

INVENTOR
JEAN MAURICE
By Irwin S. Thompson
ATTY.

INVENTOR
JEAN MAURICE
By Irwin S. Thompson
ATTY.

May 31, 1966  J. MAURICE  3,253,684
DRIVE TRANSMISSIONS

Filed July 24, 1964  6 Sheets-Sheet 6

INVENTOR
JEAN MAURICE
By Irwin S. Thompson
ATTY.

United States Patent Office 3,253,684
Patented May 31, 1966

---

3,253,684
DRIVE TRANSMISSIONS
Jean Maurice, Paris, France, assignor to Societe Anonyme
Francaise du Ferodo, a corporation of France
Filed July 24, 1964, Ser. No. 384,867
Claims priority, application France, Aug. 6, 1963,
PV 943,891
12 Claims. (Cl. 192—3.2)

The present invention relates to drive transmissions between a driving and a driven member, comprising a declutchable hydraulic coupling apparatus, which may be a torque converter or coupler, and its control system, a fixed sheath or housing surrounding the said apparatus, a rotary oil filled enclosure under pressure disposed within the housing and having an impeller connected to the driving member and hydraulically entraining a turbine, two clutch plates coupled to the turbine and intended to grip or release a friction plate connected to the driven member, the enclosure being divided into two oil spaces of which one is external and the other internal relative to the said plates, an oil pump driven by the rotary enclosure, conduits connected respectively to the intake and discharge of the pump and to each of the spaces, an actuation device secured on the housing and forming an oil container to supply the pump intake and comprising distribution devices which are responsive to the operating conditions of a change speed gearbox (which may be a forward and/or change speed gearbox) and which selectively connect the pump discharge with one or other of said spaces to engage or declutch the clutch.

The main object of the invention is to prove improved hydraulic transmission systems in general, and in transmissions of the kind hereinabove specified in particular, which will be of simpler construction and more efficient in operation than known drive transmissions.

According to the invention, the case contains an expansion chamber above the container and may have an airtight filler plug with a venting and overspill tube discharging surplus oil at a point distant from the exhaust system of the engine.

In order that the invention may be more fully understood some embodiments in accordance therewith will now be described by way of example with reference to the accompanying drawings, in which.

Figure 4:
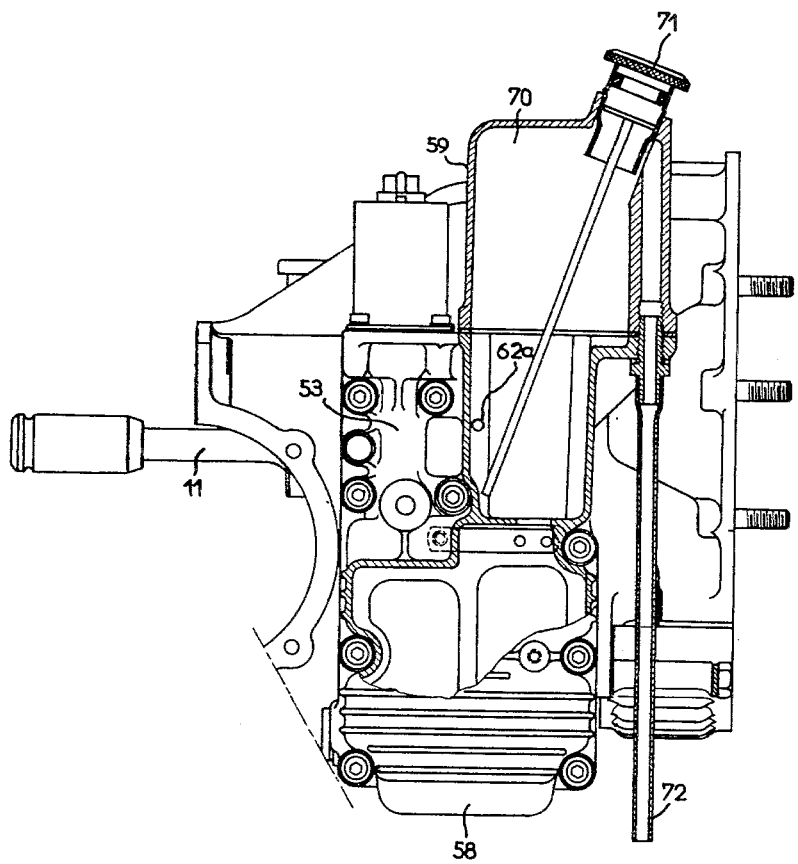
FIG. 4 is a cross section along line IV—IV of FIG. 3.
Figure 5:
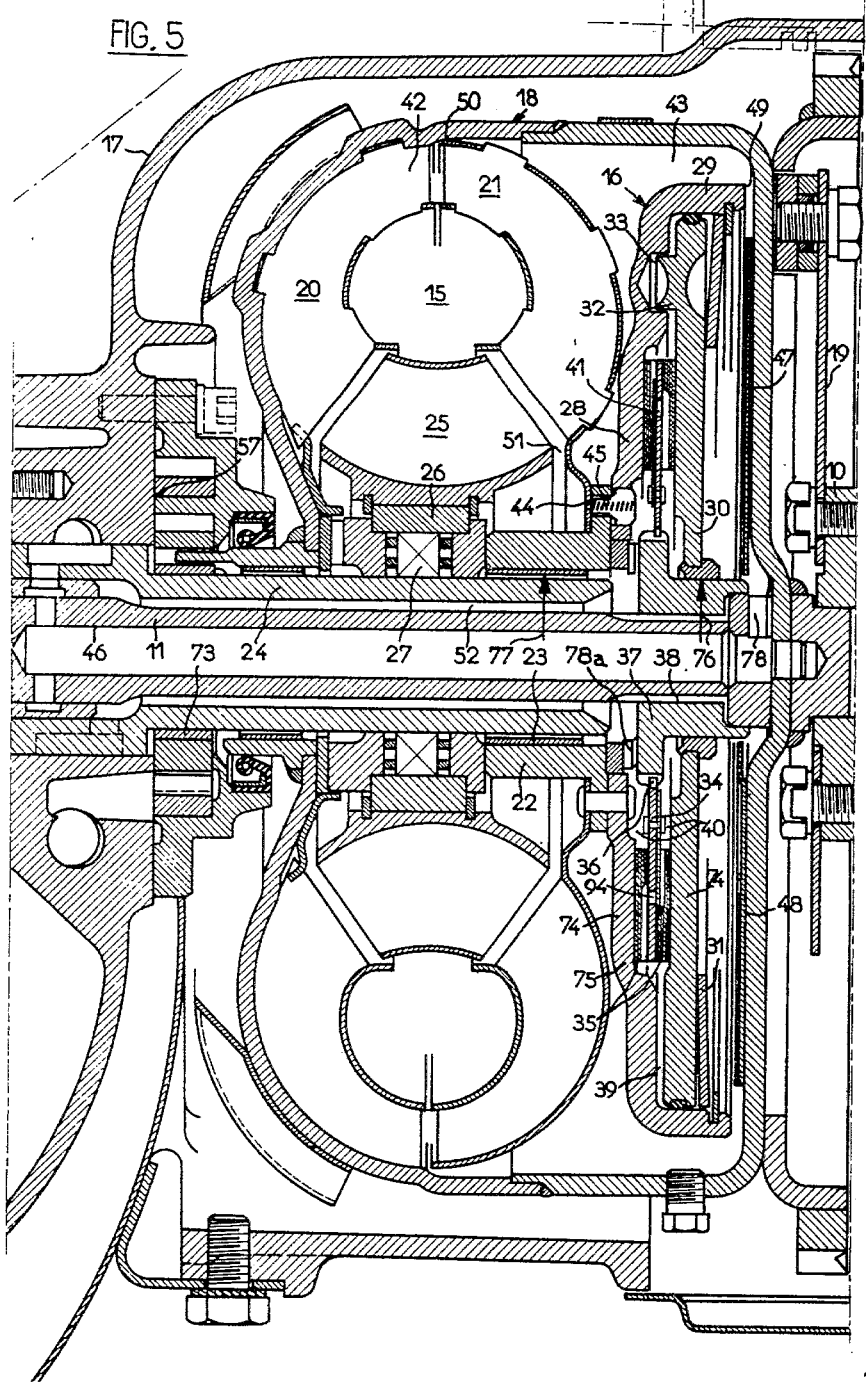
FIG. 5 is a cross section on an enlarged scale of part of FIG. 1.
Figure 6:
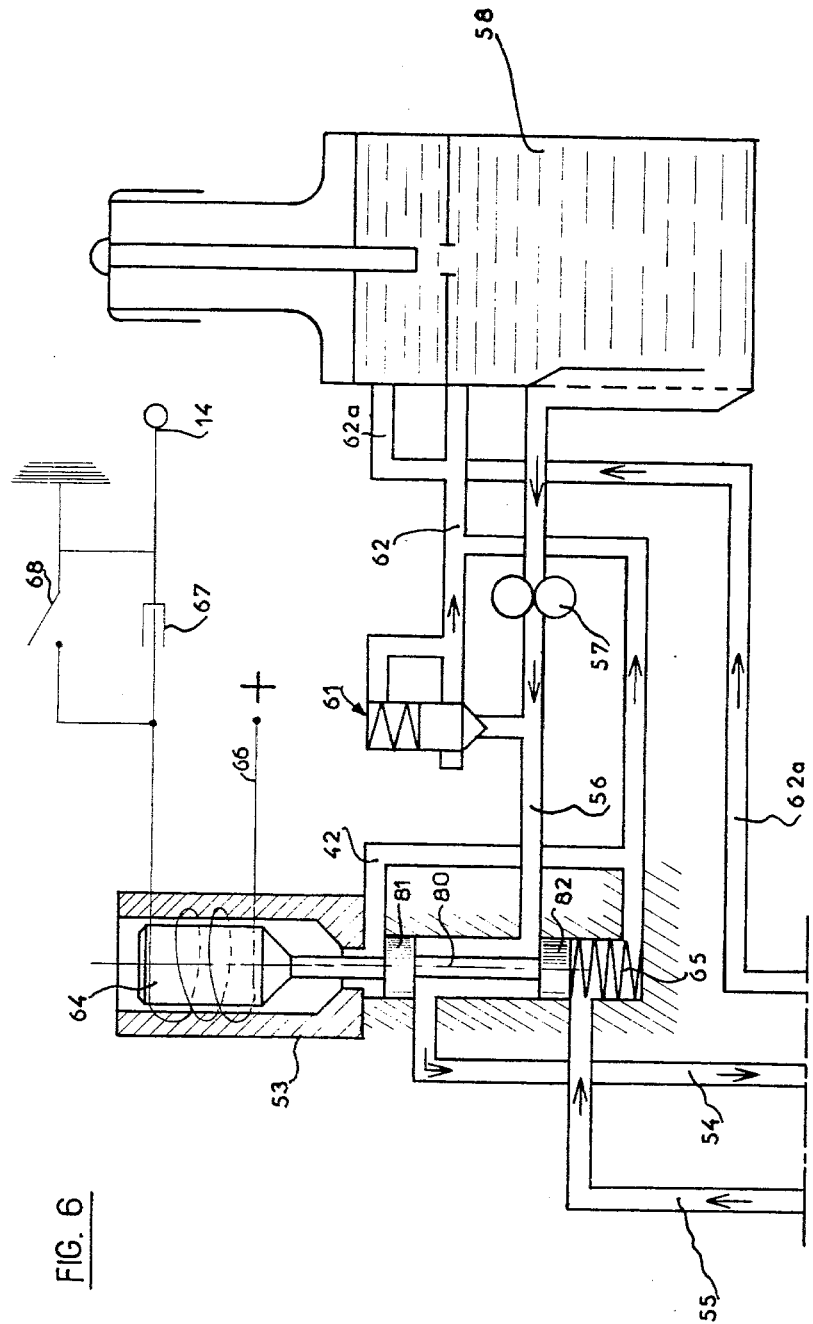
FIG. 6 is a diagram of the hydraulic actuation system of the transmission.

Referring to FIGS. 1 to 6, these show an automotive vehicle transmission, having a driving shaft 10 and a driven shaft 11 fast in rotation with an input shaft 12 of a gearbox and or reverse speed gearbox 13, the gear-change lever being shown diagrammatically at 14 in FIG. 6.

The transmission comprises a hydraulic coupling apparatus 15, declutchable by means of a clutch 16. The apparatus 15 is shown in the form of a hydraulic torque converter but may equally be formed by a hydraulic coupler.

A fixed housing 17 is intercalated between the engine casing and gearbox casing. In this housing 17 is disposed a bell shaped rotary enclosure 18 filled with oil under pressure and comprising the converter 15 and the clutch 16.

Figure 1:
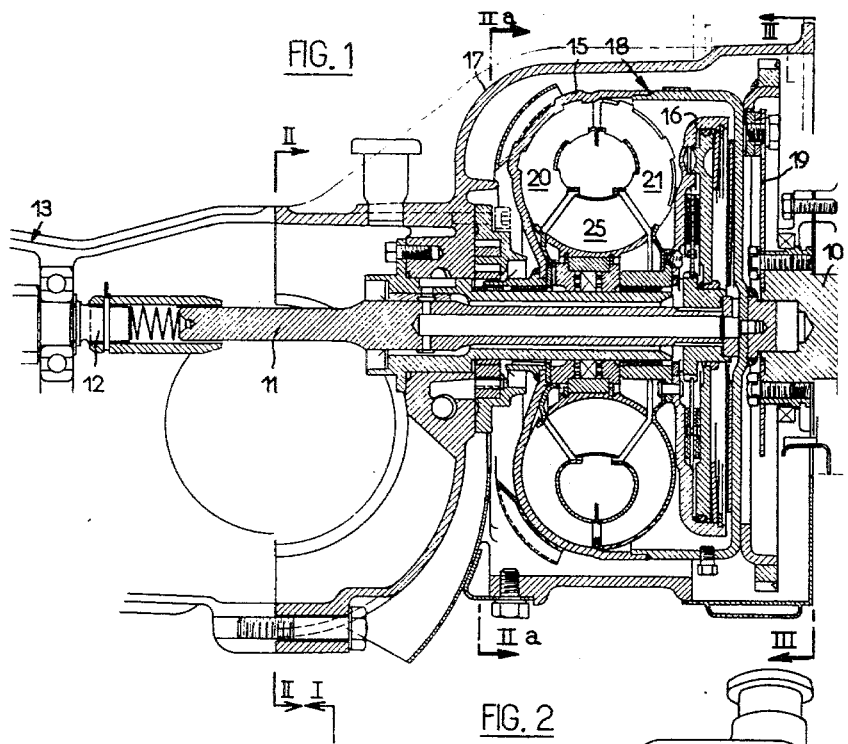
FIG. 1 is a cross section of a transmission along line I—I of FIG. 2.

To the driving shaft 10 there is coupled by means of a flexible diaphragm 19, the rotary enclosure 18 which is solid with the impeller 20 of the converter 15 (see FIGS. 1 and 5). The turbine 21 is solid with a member 22 which runs with intercalation of a bearing 23 around a fixed sleeve 24. The latter is solid with the housing 17 and surrounds the driven shaft 11. The reactor 25 is coupled to a member 26 which is prevented from turning in the opposite direction to that of the engine by means of a unidirectional free-wheel coupling 27 to the said sleeve 24.

The member 22 is made solid with the central part of a bearing plate 28 of the clutch 16. This clutch is intended to couple or uncouple the turbine 21 and the shaft 11 automatically depending on whether the gear-change lever 14 is released or operated by the user, and equally depending on whether the box 13 is in a speed ratio drive or in the neutral condition.

In a wide cylindrical and peripheral part 29 of the plate 28 forming a drum of wide diameter, there is engaged a clamping plate or piston 30 urged towards the plate 28 by an annular spring disc 31 of the Belleville type and formed by a simple annulus easy to machine, and is merely to impart an axial thrust.

The plate 30 is made fast in rotation with the plate 28 by several pegs or studs 32, for example three studs 32, which are wrought in the plate 30 by metal upsetting, and which are engaged in blind holes 33 of the plate 28. This disposition is applicable to clutches in general.

At least one friction plate 34 of small diameter and having friction linings 35 on both sides is intercalated between the plates 28 and 30 and is intended to be gripped by them. It is mounted on splines 36 wrought around a hub 37 which is itself spline-mounted at 38 on the shaft 11, which couples the plate 34 in rotation with this shaft.

It will be noted in FIG. 5 that the radius 76 of the hub 37 is substantially equal to the radius 77 of the sleeve 24 so that no axial thrust occurs when declutching on the plate-turbine assembly which forces the hub 37 against the enclosure 18 with interposition of the ring 78. Friction at 78a on a ring of wide diameter when declutching is thus eliminated. The drag moment when declutching is thus reduced to that between the ring 78 and the enclosure 18, caused by the force exerted by the oil pressure in the chamber 40 on the central part of the hub 37.

Around the periphery of the plate 34 and between the plates 28 and 30, the clutch 16 has a variable volume chamber 39 containing oil, and in the space surrounded by the linings 35 and enclosed between the plates 28 and 30 the clutch has a chamber 40 which is also of variable volume and containing oil. The peripheral chamber 39 is in communication with the chamber 40 through at least one passage 41 formed for example as shown in the plate 34, or the linings 35.

In one preferred arrangement, progressive operation is determined by the transfer of the oil from one chamber to the other through calibrated orifices wrought in the plate 34. The friction surfaces of the plates 28 and 30 are conical and substantially parallel, whereas the friction plate is plane. When the approach nears its end and the friction plate touches the plates along two circles, the oil can then flow only through the calibrated orifices 41. Means are advantageously employed to ensure that the pressure loss in 41 is greater during engagement than during declutching.

The axial size of the chamber 39 is made very small (FIG. 5), which renders it possible to assure progressive take-up for the clutch by laminar flow action. This renders it possible, without sacrificing progressive operation, to give the plates 28 and 30 a substantial thickness at 74 abreast of the linings 35, which assures satisfactory calorific capacity and prevents deterioration of these linings. It will be noted that the parts 75 are made thinner, in order nevertheless to ensure appropriate elasticity of the assembly, whilst retaining the benefit of appropriate machining of the friction tracks abreast the linings 35.

The rotary enclosure 18 filled with oil under pressure is divided into two spaces of which one is external to the plates 28 and 30 of the clutch 16 and comprises both the working circuit 42 of the converter 15 and a chamber 43 surrounding the plates 28 and 30 and disposed laterally to the converter 15. The other space is internal to the plates 28 and 30 and is formed by the two chambers 39 and 40. The two spaces 42–43 and 39–40 intercommunicate only through calibrated orifices 44 which are wrought in the member 21 and equipped with calibrated unidirectional valves 45 to allow flow in the direction 42–40 but prevent any flow in the opposite direction. Each valve 45 preferably forms a separate assembly, which is pre-assembled and simple to place in position. Advantageously it has no rubber component.

The chamber 43 is supplied with oil under pressure from a passage 46 within the shaft 11 and in communication with a series of passages 47 disposed in fan shape and having a low pressure loss. Each passage may be formed by mounting a finned plate 48 on the enclosure 18. Each passage 47 opens at 49 at the periphery of the clamping chamber 43.

The working circuit 42 of the converter 15 is fed with oil from the outlet 49 of the passages 47, through a peripheral gap 50 between the impeller 20 and the turbine 21.

The oil can issue from the working circuit 42 through a gap 51 between the turbine 21 and the reactor 25 and pass into the chamber 40 through the valves 45. This chamber 40 is in communication with a gap 52 between the shaft 11 and the sleeve 25.

Figure 2:
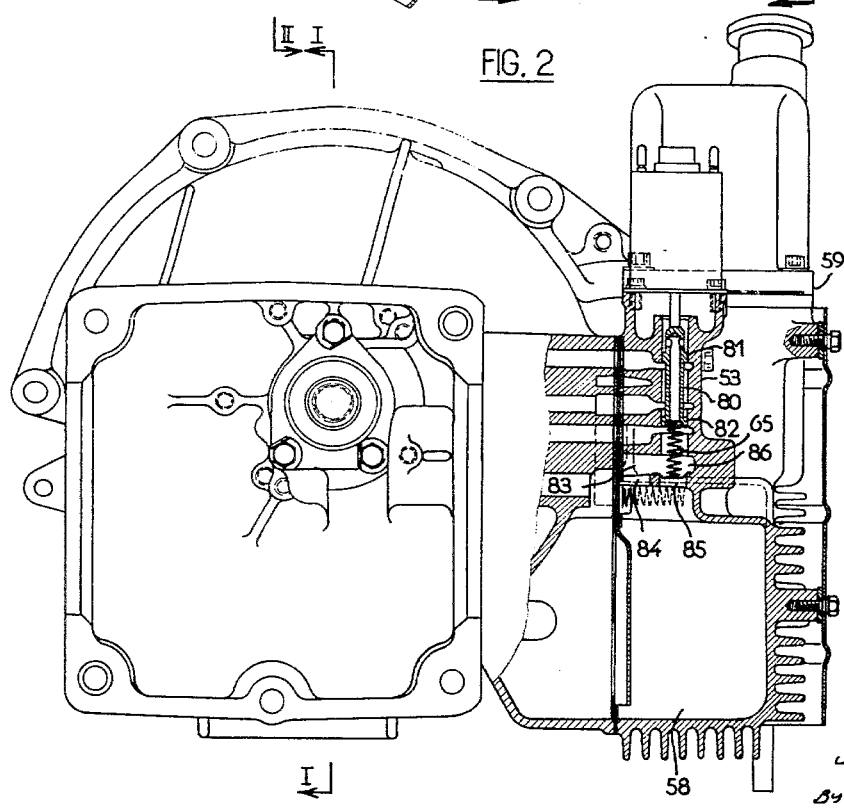
FIG. 2 is a cross section of the transmissions along line II—II of FIG. 1, with a partial cross section along line IIa—IIa of FIG. 1, looking in the directions of the arrows.
Figure 3:
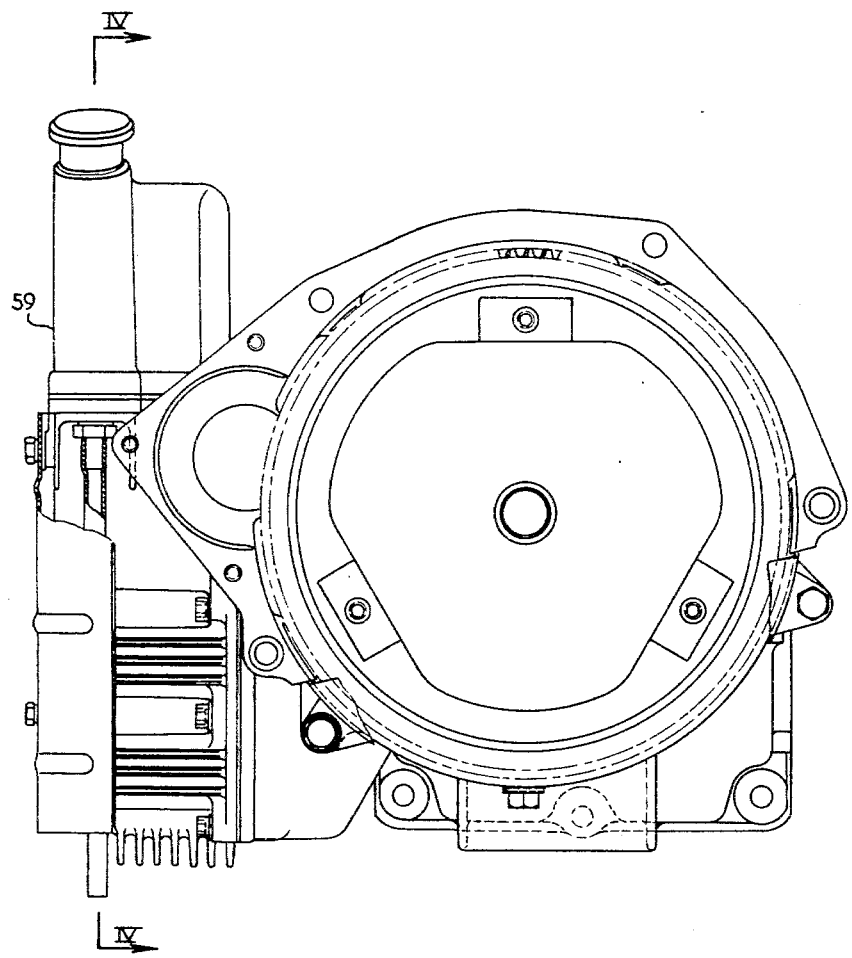
FIG. 3 is an end elevation of the transmission partly in cross section along line III—III of FIG. 1, looking in the direction of the arrows.

The passage 46 and the gap 52 are connected to a distributor 53 by corresponding conduits 54 and 55 (FIG. 6). The distributor 53 is fed with oil under pressure through a conduit 56 connected to a pump 57 (FIGS. 1, 5 and 6) drawing from a container 58. The pump 57 is advantageously disposed close to the impeller 20 and driven by the latter. The pump pinion is mounted with the intercalation of a bearing 73 allowing of high speeds of rotation. The distributor 53 is for example formed as shown by an electromagnetic valve disposed in a lateral case 59 (FIGS. 2 to 4).

This box 59 comprises the container 58 as well as an expansion chamber 70 (FIG. 4) equipped with an airtight plug 71. A venting tube 72 is incorporated to allow surplus oil to be discharged in case of overfilling, and is disposed at an appropriate point such that contingent outflow of oil is not dangerous, for example far from the exhaust piping of the engine.

A slide 80 of the distributor 53 (FIGS. 2 and 6) preferably has two bearing faces 81 and 82 in order to prevent any jamming caused by mechanical or thermal deformations of the bore. It will be noted in FIG. 2 that the oil passes into a chamber 83 before reaching the container 58 through orifices 84 and 85. As shown in FIG. 2, the arrangement does not include an oil cooler or radiator. In order to include a radiator, it is sufficient not to drill the orifices 84 and 85 and to open a communication at 86 leading to a radiator from which the fluid would flow to the container 58.

The electromagnetic distributor valve 53 is supplied with oil under pressure through the conduit 56 which is connected to the pump 57 drawing from the container 58. The conduit 56 is connected moreover to a discharge valve 61. Return to the container 58 is through a set of conduits 62. The return conduit for the discharge from different joints leading back to the container is seen at 62a (FIGS. 4 and 6).

The distributor valve 53 is operated by an electromagnet 64 and by an opposing spring 65. The feed circuit 66 of the electromagnet 64 comprises two switches in parallel: the one 67, sensing the state of the gearchange lever, the other 68 sensing the neutral position of the gearbox. The switch 67 is closed each time the user grasps the gearchange lever and it opens each time the user releases this lever. The switch 68 is closed in neutral and is opened when a gear has been engaged.

When a gear has been selected in the gearbox, the valve 53 occupies a position such that the conduit 56 is in communication with the conduit 54, whereas the conduit 55 is connected to the container 58. The oil under pressure in the conduit 54 feeds the passage 46, the passages 47, the space 43 and the working circuit 42. In passing through the valves 45, the oil undergoes a considerable loss of pressure and returns to the container 58 through the conduits 52 and 55. The clutch is kept engaged as a result of the pressure in the enclosure 43 which prevails over the pressure in 39 and 40.

When the gearbox is in the neutral position and the gearchange lever is operated, the oil under pressure in 56 feeds the conduits 55 and 52, which engenders a predominating pressure in the space 40–39, and the valves 45 are closed. The clutch is disengaged and the working circuit 42 is connected to discharge through the conduit 54.

Figure 7:
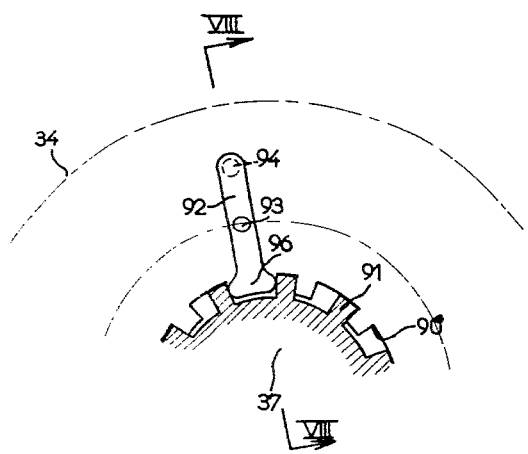
FIG. 7 is a diagrammatic partial elevational view of a variant of the friction plate of the transmission.
Figure 8:
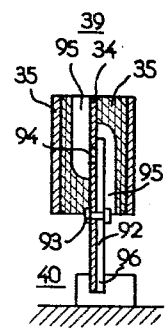
FIG. 8 is cross section along line VIII—VIII of FIG. 7.

Referring to FIGS. 7 and 8 in which passage devices 94 controlled by a shutter 92 or the like are contrived to perform an action by superimposition on the passages 41, on progressivity according to the direction of the forces exerted on the friction plate. The splines 90 of the friction plate 34 have an angular clearance with respect to the splines 91 of the hub 37. A lever 92 is mounted to turn on a spindle 93 secured to the plate 34 and forms a shutter for the hole 94 of the plate 34. The hole 94 is connected to passages 95 in the linings 35 and is intended to establish communication between the chambers 39 and 40 disposed on either side of said linings. The extremity 96 of the lever 92 is engaged without play in the splines 91 of the hub 37.

Depending on whether the angular play or backlash of the splines 90 and 91 is taken up in one direction or the other, the lever 92 pivots about the spindle 93 and covers or uncovers the orifice 94. The mounting arrangements is such that when using engine-braking, the orifice 94 is covered, which extends the range of progressive engagement and prevents any jolt when the user suddenly lifts his foot off the accelerator pedal at high speed, whereas when the engine is driving, the orifice 94 is uncovered, which prevents any slowness in engagement.

Figure 9:
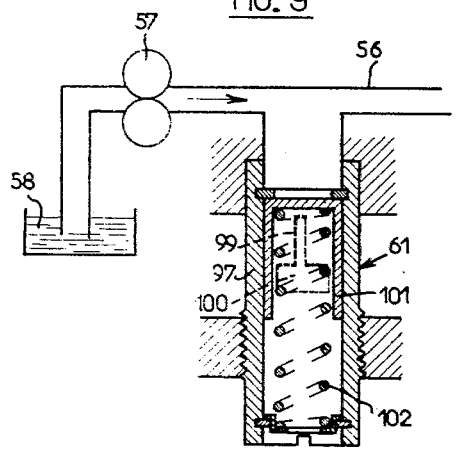
FIG. 9 is a cross section of a variant of the discharge valve of the hydraulic actuation system of the transmission; and, FIG. 10 is a perspective view of part of the discharge valve of FIG. 9.
Figure 10:
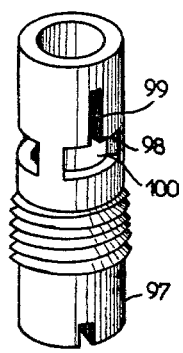

On starting off, it is appropriate however that the engagement should retain an extended range of progressivity. To this end (FIGS. 9 and 10) provision is made for the oil pressure to rise according to a specific law between idling speed and a predetermined speed. From this predetermined speed, the pressure advantageously remains constant. For this purpose, the discharge valve 61 coordinated with the pump 57 comprises a fixed tubular component 97 in which there are openings 98. Each opening 98 comprises a narrow part 99 followed by a wide part 100. In the component 97 is mounted a piston 101 which senses the pressure delivered by the pump 57 and is returned by a spring 102 to an inoperative position in which it covers the openings 98. When the engine is accelerated and the delivery from the pump increases, the piston compresses the spring 102 whose tension determines the pressure in the pipe 56. As the pressure of the pump 57 rises, the piston 101, which has initially uncovered the narrow parts 99, reaches the wide part 100 of the openings 98, which then limits the pressure. This renders it possible to assure satisfactory progressivity of take-up when starting off, as well as a modulation of the progressivity according to engine speed conditions.

What I claim is:

1. A drive transmission between a driving and a driven member comprising a declutchable hydarulic coupling apparatus, a control system for said apparatus, a fixed sheath housing surrounding sadi apparatus, a rotary oil filled enclosure under pressure disposed within said housing, a turbine in said enclosure, an impeller within said enclosure and connected to said driving member and hydraulically entraining said turbine, two clutch plates coupled to said turbine, a friction plate coupled to said driven member and engageably by said plates, the enclosure being divided into two oil spaces of which one is external and the other is internal relative to said plates, an oil pump driven by asid rotary enclosure, conduits correspondingly connected to the intake and discharge of the pump and to each of the spaces, and an actuating device secured to said housing and having an oil container to supply said pump intake and distribution devices responsive to the operative conditions of a change speed gearbox and which selectively connect the pump discharge with one or other of said spaces to engage or declutch the clutch, said actuating device having an expansion chamber above said oil container.

2. A drive transmission between a driving and a driven member comprising a declutchable hydraulic coupling apparatus, a control system for said apparatus, a fixed sheath housing surrounding said apparatus, a rotary oil filled enclosure under pressure disposed within said housing, a turbine in said enclosure, an impeller within said enclosure and connected to said driving member and hydraulically entraining said turbine, two clutch plates coupled to said turbine, a friction plate coupled to said driven member and engageable by said plates, the enclosure being divided into two oil spaces of which one is external and the other is internal relative to the said plates, an oil pump driven by said rotary enclosure, conduits correspondingly connected to the intake and discharge of the pump and to each of the spaces, and an actuating device secured to said housing and having an oil container connected to an expansion chamber thereabove, an air-tight filler plug in said actuating device and having a venting and overspill tube discharging the surplus oil at a point distant from the engine exhaust system, said actuating device supplying oil to said pump intake and including distribution devices responsive to the operative conditions of a change speed gearbox, and which selectively connect the pump discharge with one or other of said spaces to engage or declutch the clutch.

3. A drive transmission according to claim 1, wherein said pump is a gear pump the pinion of which is mounted on a bearing of anti-frcition material.

4. A drive transmission according to claim 1, wherein the oil space internal to the plates comprises a peripheral chamber surrounding said friction plate and is narrow in the axial direction of the transmission apparatus.

5. A drive transmission according to claim 1, wherein said oil space internal to said plates comprises a peripheral chamber surrounding said friction plate and is narrow in the axial direction of the apparatus and said plates being thick abreast the friction linings of said clutch and have thinner parts to increase their elasticity.

6. A drive transmission according to claim 2, wherein said oil space internal to said plates comprises a peripheral chamber surrounding said friction plate and is narrow in the axial direction of the apparatus and said plates are thick abreast the friction linings of said clutch and have thinner parts to increase their elasticity, and means are provided, such as a Belleville annular spring disc, operable to urge said plates into gripping engagement.

7. A drive transmission according to claim 2, wherein said plates are secured to rotate together by metal studs formed by the metal of one plate being upset and engaged in blind holes in said other plate.

8. A drive transmission according to claim 2, wherein the two spaces of said rotary enclosure are interconnected by non-return valves, each of which is a separate pre-assembled unit.

9. A drive transmission between a driving and a driven member comprising a declutchable hydraulic coupling apparatus, a control system for said apparatus, a fixed sheath housing surrounding said apparatus, a rotary oil filled enclosure under pressure disposed within said housing, a turbine in said enclosure, an impeller within said enclosure and connected to said driving member and hydraulically entraining said turbine, two clutch plates coupled to said turbine, a friction plate coupled to said driven member and engageably by said plates, the enclosure being divided into two oil spaces of which one is external and the other is internal relative to said plates, and oil pump driven by said rotary enclosure, conduits correspondingly connected to the intake and discharge of the pump and to each of the spaces, and an actuating device secured to said housing and having an oil container to supply said pump intake and distribution devices, responsive to the operative conditions of a change speed gearbox and which selectively connect the pump discharge with one or other of said spaces to engage or declutch the clutch, said actuating device having an expansion chamber above said oil container, the radii of the hub of said friction plate and of a fixed sleeve around which the turbine is rotatably mounted are substantially equal.

10. A drive transmission according to claim 9, wherein said distribution devices of said actuating device comprise a slider sliding in a cylinder, two spaced cylindrical portions on said slider, conduits connecting said cylinder with said spaces, said pump and said oil container, said conduits being connected to said cylinder so that the slider on moving in said cylinder will control the direction of oil flow from said pump through said spaces.

11. A drive transmission according to claim 10, wherein means are provided to direct the oil through a cooling radiator before it reaches the oil container.

12. A drive transmission according to claim 10, wherein at least one shutter is provided controlled by splines in said friction plate and having a clearance on the hub thereof, said shutter closing or opening an orifice in said friction plate to establish communication between two chambers separated by said friction plate.

References Cited by the Examiner

UNITED STATES PATENTS

| | | | |
|---|---|---|---|
| 2,793,726 | 5/1957 | Jandasek | 192—3.2 |
| 3,184,019 | 5/1965 | Le Brise | 192—3.2 |

FOREIGN PATENTS

| | | |
|---|---|---|
| 955,066 | 4/1964 | France. |

DON A. WAITE, *Primary Examiner.*

A. T. McKEON, *Assistant Examiner.*